Dec. 10, 1946.  D. S. DENCE  2,412,208
TRANSMISSION
Filed Sept. 11, 1944  2 Sheets-Sheet 2
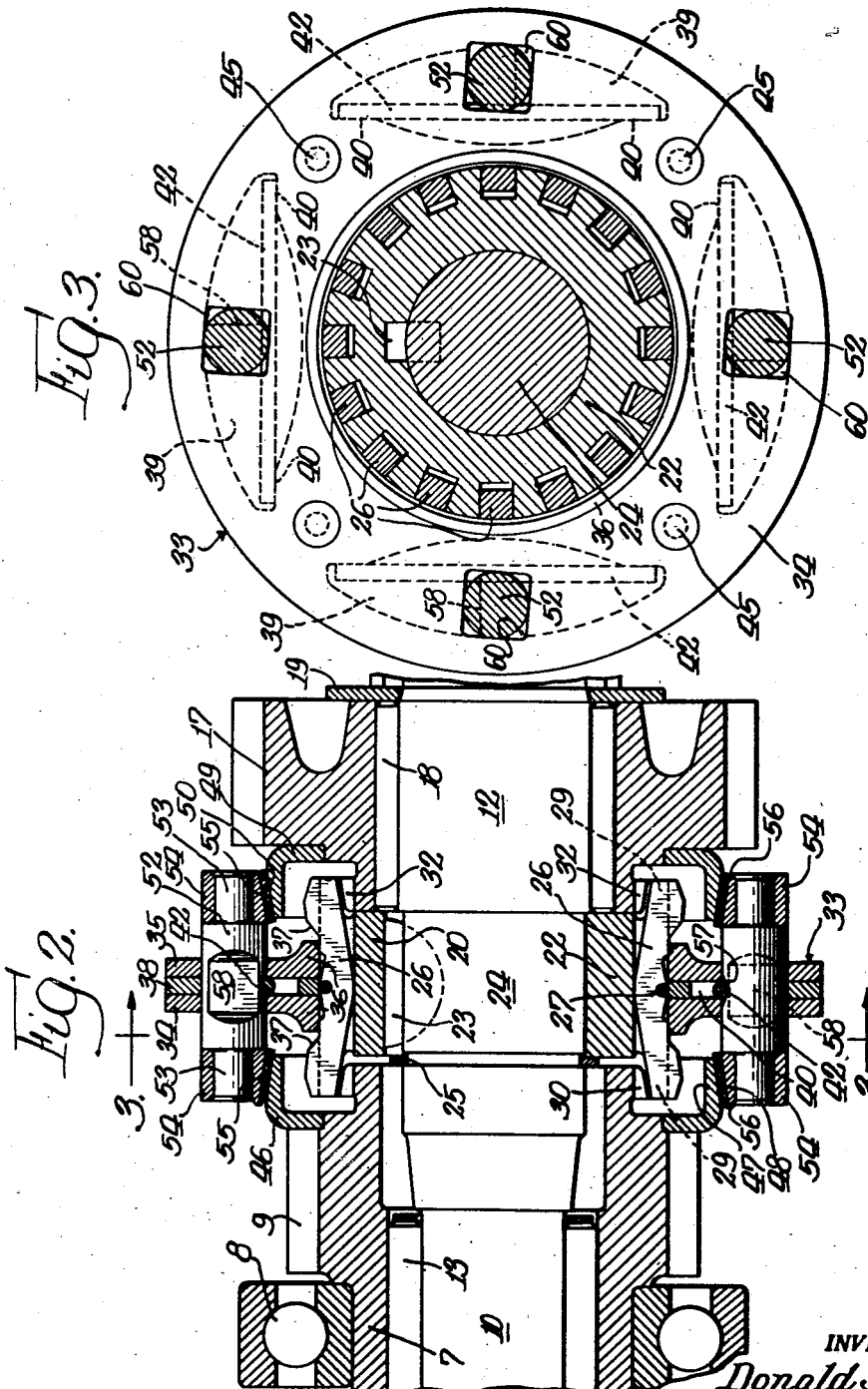
INVENTOR.
Donald S. Dence,
BY Walter E. Schirmer
Atty.

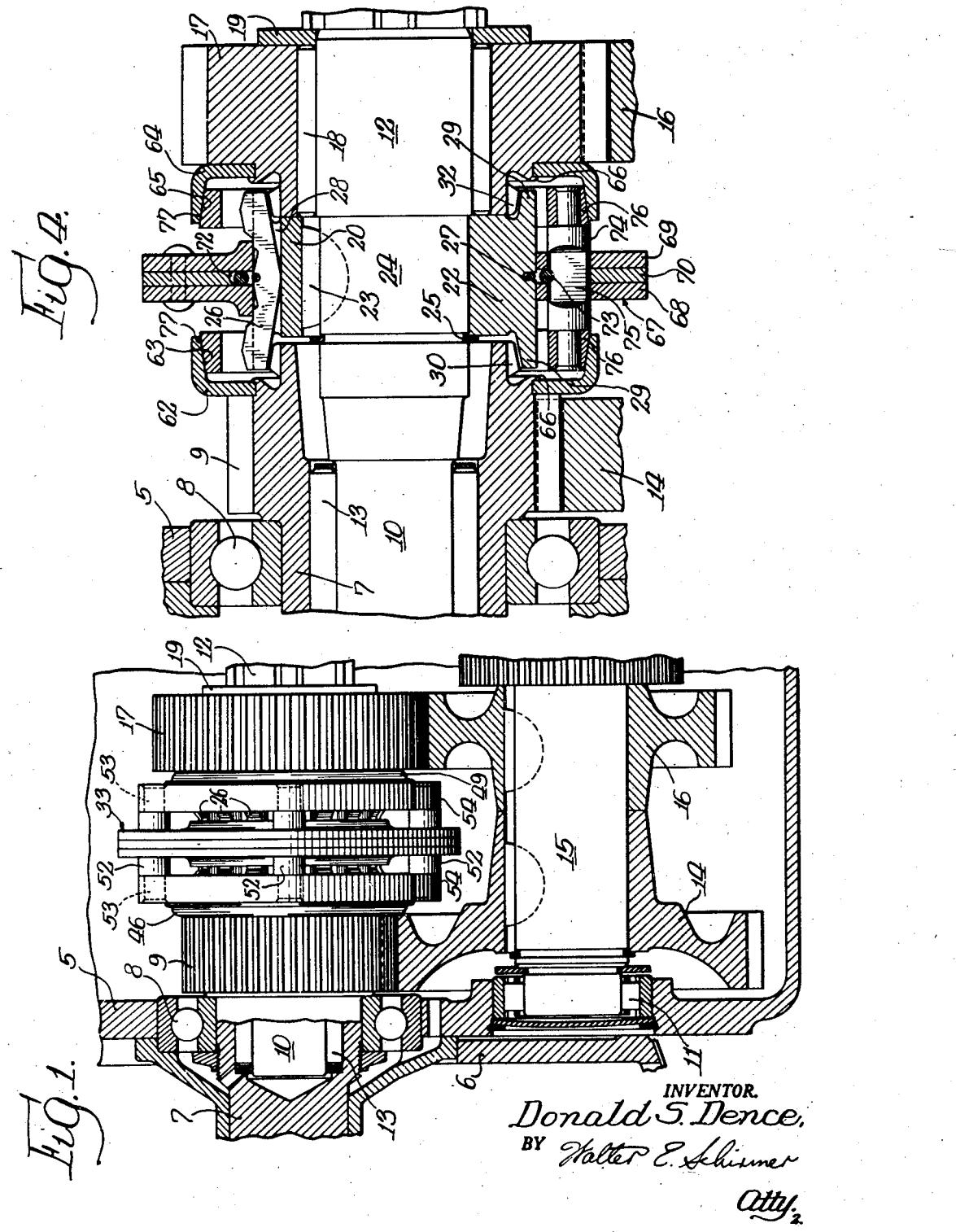

Patented Dec. 10, 1946

2,412,208

UNITED STATES PATENT OFFICE 2,412,208

TRANSMISSION

Donald S. Dence, Berrien Springs, Mich., assignor to Clark Equipment Company, Buchanan, Mich., a corporation of Michigan Application September 11, 1944, Serial No. 553,641

14 Claims. (Cl. 192—53)

1

This invention relates to transmissions, and more particularly is concerned with clutching mechanism for selectively clutching either of two gear trains to the mainshaft of the transmission.

The present invention is an improvement over that disclosed in my copending application, Serial No. 543,512, filed July 5, 1944, and is directed to the provision of synchronizing means in the clutch mechanism for facilitating smooth shifting from one gear ratio to another within the transmission.

One of the primary objects of the present invention is to provide a synchronizing mechanism in conjunction with a positive clutch which will take up less axial space than heretofore has been necessary with the conventional type of dental tooth transmission clutches in which axial shifting of the clutch gears themselves was necessary.

Still another object of the present invention is to provide a synchronizing mechanism in conjunction with such a clutch device which will insure bringing of the gears up to synchronous speed with the shaft prior to effecting positive clutching. The synchronizer is preferably of the blocking type to insure against gear clashing.

Still another advantage of the present invention is the provision of a clutch mechanism of this type which will eliminate the possibility of the transmission clutch accidentally walking out of gear when the transmission is coasting or there is a reversal of torque therethrough. This will eliminate one of the common difficulties encountered in the ordinary type of dental tooth clutch, the present construction providing for positive locking of the gear member in clutched position.

A further advantage of the present invention is the elimination of the axial shifting on a splined portion of the shaft intermediate the two gears which are to be selectively clutched to the shaft, and the substitution therefor of radial rocking members for locking the shaft and gear for conjoint rotation. This reduces the spacing required between the two gears as well as eliminating the necessity of splining the shaft. By reducing the spacing between the gears it is, of course, apparent that the over-all length of the transmission can be reduced, resulting in the saving of material and weight. This is of distinct advantage where four or more speed ratios are provided in a transmission, since the reduction is cumulative, depending upon the number of clutching means in the transmission.

2

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a partial sectional view through a transmission embodying the present invention;

Figure 2 is a detail sectional view through the transmission clutch and synchronizing mechanism;

Figure 3 is a sectional view taken substantially on line 3—3 of Figure 2; and

Figure 4 is a sectional view, corresponding to Figure 2, of a modified type of construction.

Referring now in detail to the drawings, there is disclosed in Figure 1 a transmission housing 5 which is adapted to be bolted or otherwise suitably secured to a clutch housing 6 carrying the driven shaft 7 of the clutch member. This shaft 7 extends through the end wall of the transmission housing 5 and is suitably supported therein upon the bearing assembly 8. Within the transmission proper the shaft 7 is expanded to form the gear member 9, the end of the shaft being recessed to receive the reduced end 10 of the transmission mainshaft 12. This end 10 of the shaft is journaled within the bore of the gear 9 by means of the needle rollers 13.

The gear 9 is in constant meshing engagement with a gear 14 carried upon a countershaft 15 mounted in the wall of the transmission by means of the roller bearing assembly 11. It will be noted that the gear 14 is keyed to the shaft 15 whereby the shaft in turn is adapted to drive a second gear 16 in constant meshing engagement with the gear 17 rotatably journaled as by means of the rollers 18 upon the main portion of the shaft 12. The gear 17 is held against axial movement in one direction by means of the thrust washer 19 and at the opposite end is adapted to engage the hub portion 20 of a clutch body member 22 which is keyed as at 23 on the portion 24 of the shaft 12, being held against movement by the washer 25.

The member 22 of the clutch is provided with axially directed peripheral slots adapted to receive the clutch rocker members 26 which have the internal surfaces thereof beveled in opposite directions to provide for rocking action of the members 26 radially about a center fulcrum. A suitable snap ring 27 locks the rocker members against axial displacement within the slots 28, and it will be noticed that the body member 22 has the portions thereof intermediate the slots 28 extended axially as indicated at 29 to overhang the external clutch to the portions 30 and 32 of the gears 9 and 17, respectively. It will be noted that the teeth 30 and 32 are of tapered construction, and that the ends of the rocker members 26 are adapted to be selectively locked into engagement with the teeth 30 or 32 to provide for positive clutching of either the gear 9 or the gear 17 by axial sliding movement of a collar member indicated generally at 33. The collar member 33 is made up of three disc-like members adapted to ride axially on the external annular surface of the body member 22. The two outside members 34 and 35 of the shifting collar are provided with thickened hub portions indicated at 36 having inner chamfered edges to facilitate camming action upon the cam surfaces 37 of the rocker members 26. The intermediate member 38 of the clutch collar is provided with apertures or recesses 39 indicated in detail in Figure 3 of generally oval formation but having flat spots adjacent the ends thereof as indicated at 40 providing supports for wire spring members 42. The two side members 34 and 35 close the recesses laterally and the entire assembly is preferably held together by a series of circumferentially spaced rivets 45. Any suitable type of shifter fork may be employed for engaging the collar 33 to provide for axial shifting thereof.

The gear member 9 is provided on the side face thereof adjacent the clutch with a cup-shaped annular member 46 which has the axially extending portion 47 formed with a tapered surface 48. Similarly, the gear 17 has a corresponding member 49 having the tapered surface 50.

Extending laterally through the collar member 33 are a series of pins 52 which have reduced outer ends 53 adapted to receive annular rings 54 which are circumferentially locked thereto as by stacking or the like and which have the inner annular surfaces thereof tapered to receive the friction cone rings 55. These friction cone rings are held in position by spinning over the ends 56 of the inner annular surfaces of the rings 54, thereby locking the cone rings in position on these surfaces. The pins intermediate their ends are provided with recessed portions or notches 57 for receiving the wire springs 42, and in their lateral faces are provided with flatted portions 58 for a purpose to be described hereinafter.

In the operation of this device, assuming it is desired to clutch the gear 17 to the shaft 12 the collar 33 is shifted axially to the right as viewed in Figure 2. Initial shifting movement of the collar 33 carries the pins 52 therewith, thereby frictionally engaging the cones 55 with the tapered surface 50 of the member 49 carried by the gear 17. This results in bringing the speed of rotation of the gear 17 and the shaft 12 toward synchronism. As this is approached, further axial shifting movement results in displacing the collar member 33 relative the pins 52 by deflection of the springs 42, allowing the collar member to slide axially on the external surface of the body member 22, rocking the clutch rockers 26 radially inwardly against the teeth 32 of the gear 17. Due to the relieved flats 58 on the pins 52, a limited amount of circumferential displacement of the body member and collar 33 can be produced relative to the friction surfaces 55, allowing the right-hand ends of the rocker members 26 to move downwardly into engagement between the gear teeth 32 to provide positive clutching. Further shifting movement allows the hub portion of the collar 33 to encircle the radial inwardly moved ends of the rocker members 26 against outward displacement, encircling these members so that they cannot jump out of gear until such time as the collar 33 is shifted in the opposite direction.

Upon shifting the collar 33 toward the left from a position in which the gear 17 has been clutched to the shaft, the initial movement will force the rocker members 26 to move radially outwardly toward neutral position. At the same time the pressure engagement between the friction surface 55 of the surface 50 will be relieved, and the collar member will move into a position where springs 42 again engage in notches 57 to center the entire assembly. This provides the intermediate or neutral position of the clutch. Upon further shifting of the collar 33 to the left, the initial movement will move the clutch surface 55 into engagement with the surface 48 of the gear 9, bringing this gear and the shaft into approximate synchronous speed. Upon further pressure being exerted, the springs 42 are depressed, allowing the collar member 33 to continue its movement on until it rocks the left-hand ends of the rocker members 26 downwardly into position with the teeth 30 of the gears 9 to provide a positive clutch after the shaft and gear have assumed synchronous speed. Here again the flatted or reduced portions 58 of the pins 52 allow slight relative rotation of the rocker members 26 relative to the clutch teeth 30, the blocking action preventing engagement of the clutch until such time as the teeth are in alinement. The frictional drag imposed on the collar 33 through the pins 52 when the friction surfaces are engaged produces a relative rotation of approximately one half a tooth space due to the flats 58 in the pins, thereby assuring that the rocker members 26 can move into engagement between the teeth 30. Here again the hub portion of the collar 33 will encircle the rockers 26 at the left-hand end to hold them against radial displacement until such time as the collar is again moved into its neutral position. The three members 34, 35 and 38 which comprise the collar 33 are provided with squared openings 60 through which the round pins 52 extend, and as will be noted in Figure 3 there is a distance of about one half tooth space between the portion 58 of the pin 52 and the side wall of the opening 60.

Referring now to Figure 4, it will be noted that in the main the construction here shown is substantially the same as previously described with the exception of the arrangement of the friction surfaces of the synchronizer.

Similar reference numerals have been applied to corresponding parts. In this form of the invention the gear 9 is provided with a flanged member 62 having an internal tapered surface 63, while the gear 17 is provided with a corresponding member 64 having the internal tapered surface 65. It will be noted that the members 62 and 64 are held in position on suitable shoulders on the side faces of the gears 9 and 17 by spinning over a portion of the metal in these shoulders to lock the members 62 and 64 against relative axial and circumferential displacement relative to the gears. These spun-over portions are indicated at 66. In place of this arrangement, however, the members 62 and 64 as well as the members 46 and 49 of Figure 2 may be held in position by brazing, staking or in any other suitable manner.

In this form of the invention the collar member 67 is formed of two side washers 68 and 69, respectively, and an intermediate washer 70 which is provided with recessed portions 72 receiving wire spring members 73 functioning in the same manner as the springs 42 of Figures 2 and 3. The two side members laterally confine the springs 73 against displacement.

Suitable pin members 74 extend through squared openings in the collar member 67 and are provided with flatted portions 75 for the some purpose as described in connection with Figures 2 and 3. At their reduced ends the pin members 74 carry annular ring members 76 provided with external tapered surfaces 77 adapted to frictionally engage the surfaces 63 and 65 when the collar member 67 is shifted axially toward the respective gear. This construction reduces the radial extent of the synchronizing elements over that disclosed in Figures 2 and 3, but in other respects the construction functions in exactly the same manner insofar as bringing the shaft and gear to synchronous speed.

I am aware that various changes may be made in details of design of the present construction without in any way departing from the underlying principles thereof, and I therefore do not intend to be limited to the exact construction herein illustrated and described, but only insofar as described by the scope and spirit of the appended claims.

I claim:

1. In combination, in a transmission having a shaft, axially spaced gears rotatable on said shaft, clutch means between said gears including a body member fixed on said shaft and carrying radially movable rockers fulcrumed intermediate their ends on said body member, clutch means on the adjacent portions of said gears for receiving the opposite ends of said rockers in clutching engagement, an axially shiftable collar on said member movable selectively toward opposite ends of said rockers to effect clutching engagement of the ends of the rockers toward which the collar is moved with the clutch means of the gear adjacent thereto, synchronizing cone surfaces on said gears, and friction means carried by said collar and initially shiftable therewith for selectively engaging the synchronizing surface of one of said gears prior to clutching engagement of the ends of said rockers with said gear.

2. In a transmission having a shaft with axially spaced gears rotatably mounted thereon, said gears each having a clutch gear portion and a tapered synchronizer ring on the inner face thereof, clutch means for selectively clutching each of said gears to said shaft comprising a hub fixed on said shaft intermediate said gears and carrying a peripheral series of radial rockers the opposite ends of which are selectively engageable with the adjacent clutch gear portions of said gears, an axially shiftable collar on said hub for selectively engaging the opposite ends of said rockers to effect engagement of the ends of the rockers toward which the collar is moved with the clutch means of the gear adjacent thereto, annular friction rings having pins therebetween supported in said collar and resiliently interconnected thereto for engaging the synchronizer ring of one of said gears upon initial shifting of said collar and prior to actuation of said rockers.

3. In a transmission having a shaft with axially spaced gears journalled thereon, each gear having a clutch tooth portion and a friction ring, a clutch hub fixed on said shaft intermediate said gears, a peripheral series of radial rockers carried by said hub, an axially shiftable collar on said hub movable in either direction from an intermediate neutral position for selectively rocking one or the other end of said rockers toward which the collar is moved into clutching engagement with the adjacent clutch tooth portion of one of said gears, and axially spaced synchronizer rings carried by said collar and having resilient interconnection with said collar whereby initial shifting movement of said collar from intermediate position forces one of said rings axially into engagement with the adjacent friction ring of the gear toward which said collar moves and further shifting movement of said collar releases said interconnection and simultaneously forces said rockers radially into engagement with said clutch tooth portion of said gear.

4. The transmission of claim 3 wherein said synchronizer rings have means engaging in said collar providing limited relative circumferential movement therebetween.

5. The transmission of claim 3 wherein said interconnection between said synchronizer rings and said collar includes pins extending axially through said collar, and resilient means carried by said collar engaging said pins for providing limited conjoint axial movement of said collar and rings.

6. In a transmission having a shaft, a pair of gears spaced axially thereon and rotatable relative thereto, a clutch hub intermediate said gears and fixed on said shaft, axially extending rocker members carried in the periphery of said hub, clutch portions on the faces of said gears adjacent said hub, synchronizer rings on said gears radially outwardly of said clutch portions, a collar on said hub axially shiftable to engage selectively the opposite ends of said rockers and move the same radially into engagement with the respective adjacent clutch portions on said gears, and cooperating synchronizer rings carried by said collar and engageable with said gear rings upon initial movement of said collar and prior to movement of said rockers.

7. The transmission of claim 6 including blocker means between said collar and said cooperating synchronizer rings for restraining said collar from further axial movement until said shaft and the engaged gear are substantially synchronized.

8. The transmission of claim 6 including means providing for limiting relative circumferential displacement between said collar and associated synchronizer rings.

9. In a transmission of the type having radially rocking clutch members for selectively clutching either of two axially spaced gears to a shaft, a synchronizer assembly, an axially shiftable collar between said gears for selectively engaging the opposite ends of said rocker members to effect clutching engagement of the ends engaged by said collar member with the adjacent gear and having means for supporting said assembly, and blocker means in said assembly restraining said collar from actuating said rocker members until after engagement of said synchronizer assembly with the adjacent gear.

10. In combination, a shaft having axially spaced rotatable gears thereon, a clutch hub fixed on said shaft intermediate said gears, axially extending rocker members in the periphery of said hub selectively rockable radially into and out of clutching engagement with said gears, an axially shiftable collar on said hub for selectively effecting clutching engagement of the ends of said rocker members with said gear toward which said collar is moved in the shifting movement thereof in either direction from an intermediate neutral position, and synchronizer means carried by said collar for bringing the selected one of said gears into substantially synchronous speed with said shaft upon initial shifting movement of said collar and prior to actuation of said rocker members by said collar.

11. The combination of claim 10 including blocking means between said collar and synchronizer means restraining axial movement of said collar and providing limited circumferential displacement between said collar and said synchronizer means.

12. In combination, a transmission having a shaft, axially spaced gears rotatable on said shaft, clutch means between said gears including a body member fixed on said shaft and carrying radially movable rockers fulcrumed intermediate their ends on said body member, said body member having means for supporting said rockers for substantially their entire length, clutch means on the adjacent portions of said gears for receiving the opposite ends of said rockers in clutching engagement, an axially shiftable collar on said body member movable selectively toward opposite ends of said rockers to effect clutching engagement of the ends of the rockers toward which the collar is moved with the clutch means of the gear adjacent thereto, synchronizing rings on said gears, and friction means carried by said collar and initially shiftable therewith for selectively engaging the synchronizing rings of said gears prior to clutching engagement of the ends of said rockers with said gears.

13. In combination, a transmission having a shaft, axially spaced gears on said shaft, said gears having annular flange portions on the inner ends thereof provided with external clutch teeth and having synchronizer rings spaced radially outwardly of the external clutch teeth of said gears, clutch means fixed on said shaft intermediate said gears having a hub portion provided with a series of axially extending peripheral grooves, a series of rocker members one each being disposed in said grooves and fulcrumed intermediate their ends for selective engagement of the opposite ends thereof with the clutch teeth of said gears, an axially shiftable collar on said clutch means movable selectively toward opposite ends of said rocker members to effect clutching engagement of the ends of the rocker members toward which the collar is moved with the external clutch teeth of the gear adjacent thereto, and cooperating synchronizer rings carried by said collar and engageable selectively with the synchronizing rings of said gears upon initial movement of said collar prior to movement of said rocker members.

14. In combination, a transmission having a shaft, axially spaced gears on said shaft, said gears having annular flange portions on the inner ends thereof provided with external clutch teeth and having synchronizer rings spaced radially outwardly of the external clutch teeth of said gears, clutch means fixed on said shaft intermediate said gears having a hub portion provided with a series of axially extending peripheral grooves with the portions intermediate the grooves extending axially therebeyond and spaced radially outwardly of the clutch teeth of said gears, a series of rocker members one each being disposed in said grooves and supported substantially for their entire length by the intermediate portion of said hub and fulcrumed intermediate their ends for selective engagement of the opposite ends thereof with the clutch teeth of said gears, an axially shiftable collar on said clutch means movable selectively toward opposite ends of said rocker members to effect clutching engagement of the ends of the rocker members toward which the collar is moved with the external clutch teeth of the gear adjacent thereto, and cooperating synchronizer rings carried by said collar and engageable selectively with the synchronizing rings of said gears upon initial movement of said collar prior to movement of said rocker members.

DONALD S. DENCE.